United States Patent
Lomas et al.

(10) Patent No.: US 6,866,771 B2
(45) Date of Patent: Mar. 15, 2005

(54) PROCESS AND APPARATUS FOR UPGRADING FCC PRODUCT WITH ADDITIONAL REACTOR WITH CATALYST RECYCLE

(75) Inventors: David A. Lomas, Barrington, IL (US); Rusty M. Pittman, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 127 days.

(21) Appl. No.: 10/125,618

(22) Filed: Apr. 18, 2002

(65) Prior Publication Data

US 2003/0196933 A1 Oct. 23, 2003

(51) Int. Cl.[7] .................. C10G 51/02; C10G 51/06
(52) U.S. Cl. .................. 208/74; 208/67; 208/70; 208/76; 208/77; 208/75; 208/72; 208/78; 208/113
(58) Field of Search .................. 208/67, 70, 72, 208/74, 75, 76, 77, 78, 113

(56) References Cited

U.S. PATENT DOCUMENTS

| | | | |
|---|---|---|---|
| 2,921,014 A | 1/1960 | Marshall | 208/74 |
| 2,956,003 A | 10/1960 | Marshall et al. | 208/74 |
| 3,161,582 A | 12/1964 | Wickham | 208/74 |
| 3,714,024 A | 1/1973 | Youngblood et al. | 208/78 |
| 3,748,251 A | 7/1973 | Demmel et al. | 208/74 |
| 3,799,864 A | 3/1974 | Bunn, Jr. et al. | 208/80 |
| 3,849,291 A | 11/1974 | Owen | 208/78 |
| 3,888,762 A * | 6/1975 | Gerhold | 208/120.01 |
| 3,928,172 A | 12/1975 | Davis, Jr. et al. | 208/77 |
| 4,051,013 A | 9/1977 | Strother | 208/78 |
| 4,116,814 A * | 9/1978 | Zahner | 208/78 |
| 4,172,812 A | 10/1979 | Winter | 208/72 |
| 4,297,203 A | 10/1981 | Ford et al. | 208/74 |
| 4,310,489 A | 1/1982 | Fahrig et al. | 422/110 |
| 4,402,913 A | 9/1983 | McKinney | 422/110 |
| 4,547,616 A | 10/1985 | Avidan et al. | 585/640 |
| 4,792,437 A | 12/1988 | Hettinger, Jr. et al. | 422/147 |
| 5,080,778 A | 1/1992 | Lambert | 208/111 |
| 5,176,815 A | 1/1993 | Lomas | 208/78 |
| 5,198,590 A | 3/1993 | Sofranko et al. | 568/697 |
| 5,310,477 A | 5/1994 | Lomas | 208/78 |
| 5,346,613 A | 9/1994 | Lomas et al. | 208/164 |
| 5,372,704 A * | 12/1994 | Harandi et al. | 208/74 |
| 5,401,387 A | 3/1995 | Harandi et al. | 208/74 |
| 5,451,313 A | 9/1995 | Wegerer et al. | 208/164 |
| 5,455,010 A | 10/1995 | Lomas et al. | 422/144 |
| 5,482,617 A | 1/1996 | Collins et al. | 208/227 |
| 5,547,910 A | 8/1996 | Demmel et al. | 502/42 |

(List continued on next page.)

FOREIGN PATENT DOCUMENTS

| | | |
|---|---|---|
| EP | 0 322 276 A1 | 12/1988 |
| EP | 1 046 695 A2 | 10/2000 |
| EP | 1 046 696 A2 | 10/2000 |
| WO | WO 01/00750 A1 | 1/2001 |
| WO | WO 01/00751 A1 | 1/2001 |

OTHER PUBLICATIONS

U.S. Appl. No. 09/944,511, filed Aug. 31, 2001, Lomas.
Article "A Modified FCC Process MIP for Maximizing Iso–Paraffins in Cracked Naphtha" by Xu Youhao et al., *Petroleum Processing and Petrochemicals*.

*Primary Examiner*—Walter D. Griffin
(74) *Attorney, Agent, or Firm*—John G. Tolomei; James C. Paschall

(57) ABSTRACT

A process and apparatus is disclosed for contacting feed with mixed catalyst in a secondary reactor that is incorporated into an FCC reactor. The mixed catalyst used in the secondary reactor is regenerated catalyst from a regenerator that regenerates spent catalyst from an FCC reactor that is mixed with spent catalyst from either the FCC reactor or the secondary reactor. The mixing of spent and regenerated catalyst reduces the catalyst temperature and tempers catalyst activity to inhibit both thermal and catalytic cracking reactions.

20 Claims, 2 Drawing Sheets

U.S. PATENT DOCUMENTS

| | | | |
|---|---|---|---|
| 5,584,985 A | 12/1996 | Lomas | 208/113 |
| 5,597,537 A | 1/1997 | Wegerer et al. | 422/144 |
| 5,730,859 A | 3/1998 | Johnson et al. | 208/78 |
| 5,858,207 A | 1/1999 | Lomas | 208/113 |
| 5,944,982 A | 8/1999 | Lomas | 208/164 |
| 5,965,012 A | 10/1999 | Lomas | 208/113 |
| 6,010,618 A | 1/2000 | Lomas | 208/113 |
| 6,113,776 A | 9/2000 | Upson | 208/113 |
| 6,166,282 A | 12/2000 | Miller | 585/638 |
| 2002/0003103 A1 | 1/2002 | Henry et al. | 208/106 |
| 2003/0044327 A1 | 3/2003 | Lattner et al. | 422/145 |

* cited by examiner

PROCESS AND APPARATUS FOR UPGRADING FCC PRODUCT WITH ADDITIONAL REACTOR WITH CATALYST RECYCLE

BACKGROUND OF THE INVENTION

This invention relates generally to processes for the fluidized catalytic cracking (FCC) of heavy hydrocarbon streams. More specifically, this invention relates to processes for upgrading catalytically cracked hydrocarbon feeds in a discrete reactor vessel.

DESCRIPTION OF THE PRIOR ART

The FCC process is carried out by contacting the starting material whether it be vacuum gas oil, reduced crude, or another source of relatively high boiling hydrocarbons with a catalyst made up of finely divided or particulate solid material. The catalyst is transported in a fluid-like manner by passing gas or vapor through it at sufficient velocity to produce a desired regime of fluid transport. Contact of the oil with the fluidized material catalyzes the cracking reaction. The cracking reaction deposits coke on the catalyst. Catalyst exiting the reaction zone is spoken of as being "spent", i.e., partially deactivated by the deposition of coke upon the catalyst. Coke is comprised of hydrogen and carbon and can include other materials in trace quantities such as sulfur and metals that enter the process with the starting material. Coke interferes with the catalytic activity of the spent catalyst by blocking acid sites on the catalyst surface where the cracking reactions take place. Spent catalyst is traditionally transferred to a stripper that removes adsorbed hydrocarbons and gases from catalyst and then to a regenerator for purposes of removing the coke by oxidation with an oxygen-containing gas. An inventory of catalyst having a reduced coke content, relative to the spent catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated between the reaction zone and the regeneration zone. The fluidized catalyst, as well as providing a catalytic function, acts as a vehicle for the transfer of heat from zone to zone. The FCC processes, as well as separation devices used therein are fully described in U.S. Pat. No. 5,584,985 B1 and U.S. Pat. No. 4,792,437 B1, the contents of which are hereby incorporated by reference. Specific details of the various contact zones, regeneration zones, and stripping zones along with arrangements for conveying the catalyst between the various zones are well known to those skilled in the art.

The FCC reactor cracks gas oil or heavier feeds into a broad range of products. Cracked vapors from the FCC unit enter a separation zone, typically in the form of a main column, that provides a gas stream, a gasoline cut, light cycle oil (LCO) and clarified oil (CO) which includes heavy cycle oil (HCO) components. The gas stream may include dry gas, i.e., hydrogen and $C_1$ and $C_2$ hydrocarbons, and liquefied petroleum gas ("LPG"), i.e., $C_3$ and $C_4$ hydrocarbons. LPG and dry gas are not as valuable as naphtha in many regions. However, LPG is more valuable than naphtha in some regions. The gasoline cut may include light, medium and heavy gasoline components. A major component of the heavy gasoline fraction comprises condensed single ring aromatics. A major component of LCO is condensed bicyclic ring aromatics.

Subjecting product fractions to additional reactions is useful for upgrading product quality. The recracking of heavy product fractions from the initially cracked FCC product is one example. Typically, in recracking, uncracked effluent from a first riser of an FCC reactor is recontacted with catalyst at a second location to cleave larger molecules down into smaller molecules. For example, U.S. Pat. No. 4,051,013 B1 discloses cracking both gasoline-range feed and gas oil feed in the same riser at different elevations. WO 01/00750 A1 discloses introducing gasoline feed and FCC feed at different elevations in a riser reactor, separating the cracked product and recycling portions thereof back to the same riser reactor.

U.S. Pat. No. 2,921,014 B1, U.S. Pat. No. 3,161,582 B1, U.S. Pat. No. 5,176,815 B1 and U.S. Pat. No. 5,310,477 B1 all disclose cracking a primary hydrocarbon feed in a riser of an FCC unit and cracking a secondary hydrocarbon feed in a reactor into which the riser exits. As a result, both cracked products mix in the reactor, to some extent, which could negate the incremental upgrade resulting from cracking the secondary hydrocarbon feed, particularly if it is a fraction of the cracked primary hydrocarbon feed. U.S. Pat. No. 2,956,003 avoids this disadvantage to some extent by separating the vapor product and the catalyst of the riser effluent and contacting the secondary hydrocarbon feed in a reactor which receives the separated catalyst.

FCC units employing two risers are known. U.S. Pat. No. 5,198,590 B1, U.S. Pat. No. 4,402,913 B1, U.S. Pat. No. 4,310,489 B1, U.S. Pat. No. 4,297,203 B1, U.S. Pat. No. 3,799,864 B1, U.S. Pat. No. 3,748,251 B1, U.S. Pat. No. 3,714,024 B1 and U.S. Ser. No. 2002/0003103 A1 disclose two riser FCC units in which feeds are predominantly cracked in both risers. In these patents, both risers communicate with the same recovery conduit and/or reactor permitting commingling of gaseous products. In U.S. Pat. No. 5,730,859 B1, all of the effluent from one riser is fed to the other riser, without first undergoing a product separation. U.S. Pat. No. 4,172,812 B1 teaches recracking all or a part of cracked product from a riser of an FCC unit over a catalyst having a composition that is different from the catalyst composition in the riser. U.S. Pat. No. 5,401,387 discloses cracking feed in a fixed, fluidized or moving bed of shape selective catalyst and feeding all or part of the cracked effluent mixed with heavier feed to an FCC unit. In U.S. Pat. No. 5,944,982 B1, although both risers terminate in the same reactor vessel, gaseous products from each riser are isolated from the other.

Two types of flow regimes have been used in secondary reactors. Transport flow regimes are typically used in FCC riser reactors. In transport flow, the difference in the velocity of the gas and the catalyst, called the slip velocity, is relatively low, typically less than 0.3 m/s (1.0 ft/s) with little catalyst back mixing or hold up. Slip velocity is calculated by the following formula:

$$v_S = \frac{u_g}{\varepsilon} - u_S \qquad (1)$$

where $v_s$ is the slip velocity, $u_g$ is the superficial gas velocity, $u_s$ is the catalyst velocity and $\varepsilon$ is the void fraction of the catalyst. Another way to characterize flow regimes is by slip ratio which is the ratio of actual density in the flow zone to the non-slip density in the flow zone. The non-slip density is calculated by the ratio of catalyst flux to the superficial gas velocity:

$$\rho_{ns} = \frac{\omega_c}{u_g} \quad (2)$$

where $\rho_{ns}$ is the non-slip density in the flow zone, $\omega_c$ flux of the catalyst and $u_g$ is the superficial gas velocity. Catalyst flux is the mass flow rate of catalyst per cross-sectional area of the reactor. The slip ratio is proportional to the hold up of catalyst in the flow zone. Typically, a slip ratio for a transport flow regime does not reach 2.5. Consequently, the catalyst in the reaction zone maintains flow at a low density and very dilute phase conditions. The superficial gas velocity in transport flow is typically greater than 3.7 m/s (12.0 ft/s), and the density of the catalyst is typically no more than 48 kg/m$^3$ (3 lb/ft$^3$) depending on the characteristics and flow rate of the catalyst and vapor. In transport mode, the catalyst-vapor mixture is homogeneous without vapor voids or bubbles forming in the catalyst phase.

Bubbling bed secondary reactors are also known. In a bubbling bed, fluidizing vapor forms bubbles that ascend through a discernible top surface of a dense catalyst bed. Only catalyst entrained in the vapor exits the reactor with the vapor. The superficial velocity of the vapor is typically less than 0.5 m/s (1.5 ft/s) and the density of the dense bed is typically greater than 640 kg/m$^3$ (40 lb/ft$^3$) depending on the characteristics of the catalyst. The mixture of catalyst and vapor is heterogeneous with pervasive vapor bypassing of catalyst.

Intermediate of bubbling beds and transport flow regimes are turbulent beds and fast fluidized regimes. U.S. Pat. No. 4,547,616 B1 discloses a turbulent flow regime for oxygenate conversion. In a turbulent bed, the mixture of catalyst and vapor is not homogeneous. The turbulent bed has a dense catalyst bed with elongated voids of vapor forming within the catalyst phase, and the surface is less discernible. Only entrained catalyst leaves with the vapor and the catalyst density is not quite proportional to its elevation within the reactor. U.S. Pat. No. 6,166,282 B1 discloses a fast fluidized flow regime used for oxygenate conversion. In a fast fluidized regime, there is no dense catalyst bed. Instead, the catalyst and vapor phases are homogeneous. Catalyst exits the reaction zone a small amount slower than the vapor exiting the reaction zone. Hence, for a fast fluidized flow regime the slip velocity is typically greater than or equal to 0.3 m/s (1.0 ft/s) and the slip ratio is greater than or equal to 2.5 for most FCC catalysts. Fast fluidized beds have been used in FCC combustors for regenerating catalyst and in coal gasification.

U.S. Pat. No. 3,928,172 B1 teaches an FCC unit with a secondary reactor. Gas oil is cracked in a riser of the FCC unit with unregenerated spent catalyst under transport flow conditions. A heavy naphtha fraction of the cracked gas oil, boiling between 127° and 232° C. (260° and 450° F.), produced in the riser is recracked in the secondary reactor over regenerated catalyst in a bubbling bed. The spent catalyst used in the riser comes from the dense bubbling bed in the secondary reactor.

U.S. Pat. No. 5,346,613 B1, U.S. Pat. No. 5,451,313 B1, U.S. Pat. No. 5,455,010 B1, U.S. Pat. No. 5,597,537 B1, U.S. Pat. No. 5,858,207 B1, U.S. Pat. No. 6,010,618 B1 and U.S. Pat. No. 6,113,776 B1 all disclose recycling unregenerated spent catalyst that has been contacted with feed back to the reactor section to be mixed with regenerated catalyst and recontacted with new feed for purposes of lowering the temperature of the catalyst to contact the feed. U.S. Pat. No. 5,965,012 B1 discloses contacting a first feed with mixed unregenerated spent catalyst and regenerated catalyst in a conduit that exits into a mixing vessel. Vapor product is removed from the mixing vessel and the mixed catalyst contacted with the first feed is further mixed with other unregenerated spent catalyst and the further mixed catalyst contacts a second feed in an FCC riser.

In gasoline production, many governmental entities are restricting the concentration of olefins allowed in the gasoline pool. Reducing olefin concentration without also reducing value is difficult because higher olefin concentrations typically promote higher Research Octane Numbers (RON) and Motor Octane Numbers (MON), but the latter to a lesser extent. Octane value or Road Octane Number is the average of RON and MON. Merely saturating olefins typically yields normal paraffins which typically have low octane value. Additionally, saturation requires the addition of hydrogen, which is expensive and in some regions, difficult to obtain.

U.S. application Ser. No. 09/944,511 discloses reacting naphtha over FCC catalyst in a separate reactor of an FCC unit under conditions that promote hydrogen transfer reactions without having to add hydrogen. The hydrogen transfer reactions promote reformulation of olefins to isoparaffins and aromatics. The reformulation to isoparaffins reduces octane value, but the reduction is not as great because the resulting paraffins are isoparaffins, which have a greater octane value than normal paraffins. Moreover, the reformulation of larger olefins to aromatics operates to boost the octane value, thereby offsetting any loss due to saturation of olefins to isoparaffins.

EP 1 046 696 A2 and EP 1 046 695 A2 disclose contacting feedstock with catalyst in a first reaction zone of a riser and quenching the effluent of the first reaction zone with a medium which can include a regenerated and cooled catalyst or naphtha. The quenched effluent from the first reaction zone passes to a second reaction zone of the same riser which may have a greater diameter than the first reaction zone under conditions that promote isomerization and hydrogen transfer reactions. The feedstock to the first reaction zone may include naphtha. An article, X. Youhao, Z. Jiushun & L. Jun, "A Modified FCC Process MIP for Maximizing Iso-Paraffins in Cracked Naphtha", *Petroleum Processing & Petrochemicals* (August 2000), discloses reacting gasoline over an FCC spent catalyst. These disclosures report high reductions in olefin concentration and increases in isoparaffin and aromatics concentration.

Feedstocks for FCC units typically include organic sulfur and nitrogen. During FCC operation, some of the organic sulfur and nitrogen are converted to hydrogen sulfide and ammonia, which are easily removed. Some, however, are converted to coke, lighter sulfur and nitrogen compounds and mercaptans. This coke is then oxidized in the catalyst regenerator to form sulfur oxides and nitrogen oxides. Stricter environmental limits on sulfur and nitrogen compound emissions have precipitated lower sulfur specifications for fuel products thereby raising interest in removing nitrogen and sulfur compounds from FCC gasoline. As demand for cleaner fuels and use of high sulfur and high nitrogen feedstocks increase, the need for sulfur and nitrogen removal from FCC gasoline will become even greater.

U.S. Pat. No. 5,482,617 discloses a process for desulfurizing a hydrocarbon stream such as FCC naphtha containing sulfur by contacting it with an acidic catalyst in a bed. As much as 50 wt-% of the sulfur is converted to hydrogen sulfide.

WO 01/00751 A1 discloses a conversion process for reducing olefins, sulfur and nitrogen concentrations in gasoline. Preheated gasoline is contacted with catalyst having no more than 2.0 wt-% carbon deposition and a temperature of below 600° C. The gasoline product has an olefin content reduced to below 20 wt-% and sulfur and nitrogen contents are also reduced. It appears that the regenerated catalyst is cooled in a catalyst cooler to achieve the temperature below 600° C. before contacting the gasoline feed.

Cooling catalyst with a cooler can be inefficient. The cracking reactions in an FCC reactor are endothermic. In addition, heat is required to vaporize feed for the secondary reactor. Hence, cooling the catalyst withdraws heat from the process that must be replaced in order to vaporize the feed to the separate reactor. The heat is replaced by generating more coke on catalyst to fuel the regenerator with the sacrifice of valuable product.

It is an object of the present invention to provide a method for enhancing the quality of product from an FCC reactor by further contacting it with catalyst at lower temperatures.

SUMMARY OF THE INVENTION

It has now been discovered that when contacting a product fraction from an FCC reactor with catalyst in a secondary reactor, higher catalyst temperatures increase the undesirable cracking to dry gas and LPG. According to the present invention, mixing unregenerated spent catalyst and regenerated catalyst in the secondary reactor incorporated into an FCC reactor can reduce the catalyst temperature and the concomitant generation of dry gas and LPG. In addition recycling unregenerated spent catalyst moderates the cracking activity of the FCC catalyst, which is believed to further suppress cracking reactions, while maintaining the reformulation activity. Hence, reformulation reactions can be promoted in a secondary reactor over cracking reactions by increasing the ratio of cooler spent to hot regenerated catalyst subject to ensuring sufficient heat delivery to the secondary reactor to vaporize the feed.

Accordingly, in one embodiment, the present invention relates to an apparatus for cracking and further treating hydrocarbons. The apparatus comprises a fluidized catalytic cracking reactor comprising a first reactor vessel for contacting a first hydrocarbon stream with catalyst to yield cracked hydrocarbons and spent catalyst and a first separator vessel for separating the spent catalyst from the cracked hydrocarbons. A secondary reactor comprises a second reactor vessel for contacting a second hydrocarbon stream with a mixture of regenerated catalyst and recycled spent catalyst or recycled spent mixed catalyst to yield upgraded hydrocarbons and spent mixed catalyst and a second separator vessel for separating the upgraded hydrocarbons from the spent mixed catalyst. A recycle catalyst pipe communicates with the second reactor vessel for delivering the spent catalyst or the spent mixed catalyst to the second reactor vessel from the first separator vessel or the second separator vessel, respectively. A first regenerated catalyst pipe communicates with the first reactor vessel for delivering regenerated catalyst to the first reactor vessel and a second regenerated catalyst pipe communicates with the second reactor vessel for delivering regenerated catalyst to the second reactor. A regenerator including an oxidizing gas distributor communicates with the regenerated catalyst pipe. The regenerator receives the spent catalyst to be contacted with the oxidizing gas from the oxidizing gas distributor to yield regenerated catalyst and flue gas. The regenerator includes a separator for separating the regenerated catalyst from the flue gas. Lastly, a spent catalyst pipe communicates the first separator vessel with the regenerator for delivering spent catalyst from the first separator to the regenerator.

In another embodiment, the present invention relates to an apparatus for cracking and further treating hydrocarbons. The apparatus comprises a fluidized catalytic cracking reactor comprising a first reactor vessel for contacting a first hydrocarbon stream with catalyst to yield cracked hydrocarbons and spent catalyst and a first separator vessel for separating the first spent catalyst from the cracked hydrocarbons. A secondary reactor comprises a second reactor vessel for contacting a second hydrocarbon stream with a mixture of recycled spent mixed catalyst and regenerated catalyst to yield upgraded hydrocarbons and spent mixed catalyst and a second separator vessel for separating the upgraded hydrocarbons from the spent mixed catalyst. A recycle catalyst pipe communicates with the second reactor vessel for delivering the spent mixed catalyst to the second reactor vessel from the second separator vessel. A first regenerated catalyst pipe communicates with the first reactor vessel for delivering regenerated catalyst to the first reactor and a second regenerated catalyst pipe communicates with the second reactor vessel for delivering regenerated catalyst to the second reactor. A regenerator including an oxidizing gas distributor communicates with the regenerated catalyst pipe. The regenerator receives the spent catalyst to be contacted with the oxidizing gas from the oxidizing gas distributor to yield regenerated catalyst and flue gas. The regenerator includes a separator for separating the regenerated catalyst from the flue gas. Lastly, a spent catalyst pipe communicates with the first separator vessel and the regenerator for delivering spent catalyst to the regenerator.

In a further embodiment, the present invention relates to a process for cracking and further treating hydrocarbons. The process comprises contacting a first hydrocarbon feed stream with regenerated catalyst to yield cracked hydrocarbons and spent catalyst. The spent catalyst is separated from the cracked hydrocarbons in a first separator vessel. At least a portion of the spent catalyst is regenerated to provide regenerated catalyst. Regenerated catalyst and spent catalyst or spent mixed catalyst is mixed to provide mixed catalyst. A second hydrocarbon feed stream is contacted with the mixed catalyst to yield upgraded hydrocarbons and spent mixed catalyst. Then the upgraded hydrocarbons are separated from the spent mixed catalyst in a second separator vessel.

Additional objects, embodiment and details of this invention can be obtained from the following detailed description of the invention.

DETAILED DESCRIPTION OF THE INVENTION

We have found that when reacting hydrocarbons produced by an FCC process in a secondary reactor they can potentially crack down to dry gas and LPG which are less valuable than naphtha in many regions. Reduced catalyst temperature will suppress thermal cracking of the naphtha olefins to dry gas and LPG which allows for higher overall naphtha yields. In one embodiment, the present invention recycles spent catalyst to the secondary reactor to be recontacted with feed. The recycled spent catalyst mixes with regenerated catalyst from a regenerator to lower the overall mixed catalyst temperature.

Mixing the recycled spent catalyst with regenerated catalyst is a preferred method of cooling catalyst compared to use of an indirect heat exchange catalyst cooler, which operates to withdraw heat from the system that must be replaced by the generation and burning of more coke. Even if heat is conserved by heating feed to a reactor by indirect heat exchange with hot spent catalyst in the catalyst cooler, this means of heating would still be less efficient and prone to cause coking.

The use of recycled, coke-bearing, spent catalyst also benefits operation by tempering catalyst activity. The strong acid sites of the FCC catalyst are suppressed through formation of coke. Consequently, the gasoline reformulation activity relative to the cracking activity is increased. Moderating the catalyst activity permits higher naphtha yields to be reached at the expense of production of dry gas and LPG.

We have also discovered that better mixing between the feed and the catalyst promotes hydrogen transfer reactions and catalytic cracking reactions while reducing the undesirable generation of coke and dry gas. While not wishing to be bound by any particular theory, it is believed that better mixing allows the hydrocarbon to reach the catalyst surface more rapidly which enhances hydrogen transfer and catalytic cracking reactions. This allows the total contact time and/or catalyst to feed ratio to be reduced which minimizes dry gas and coke yield at a given conversion. Hence, reactor conditions that are more vigorous than a bubbling bed such as a fast fluidized flow regime will provide better product yields.

The present invention may be described with reference to three components: an FCC reactor 10, a regenerator 50 and a secondary reactor 70. Although many configurations of the present invention are possible, one specific embodiment is presented herein by way of example. All other possible embodiments for carrying out the present invention are considered within the scope of the present invention.

Figure 1:
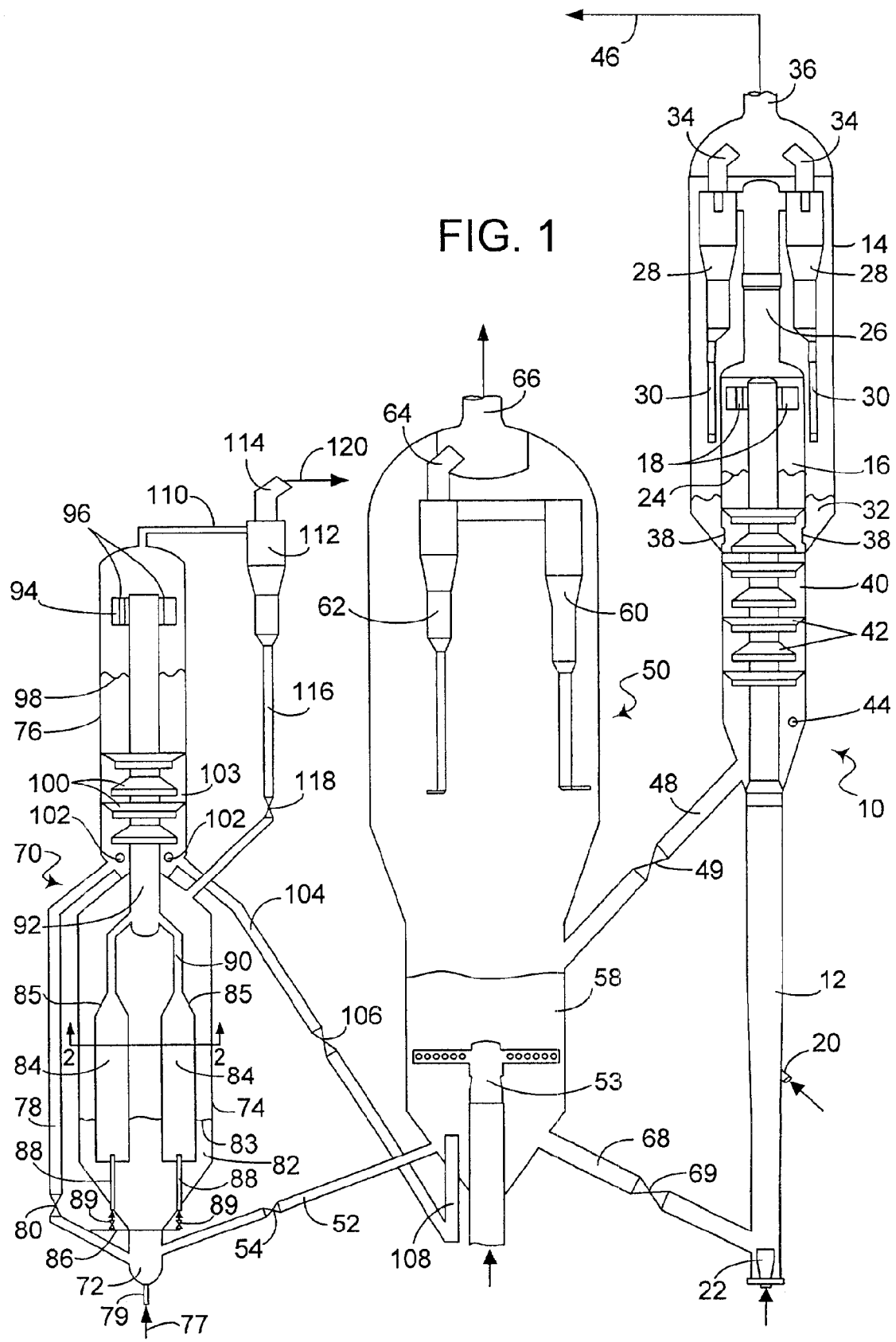
FIG. 1 is a sectional, elevational, schematical view of an FCC reactor incorporating a secondary reactor in accordance with the present invention.

In the embodiment of the present invention in FIG. 1, the FCC reactor 10 comprises a reactor vessel 12 in the form of a conduit that is preferably vertical which is also known as a riser. The reactor vessel 12 extends upwardly through a lower portion of a separator vessel 14 as in a typical FCC arrangement. The reactor vessel 12 preferably has a vertical orientation within the separator vessel 14 and may extend upwardly through the bottom of the separator vessel 14 or downwardly from the top of the separator vessel 14. The reactor vessel 12 terminates in a disengagement section 16 of the separator vessel 14 at swirl tubes 18. A hydrocarbon feed stream is fed to the riser at a nozzle 20 which is contacted and vaporized by hot regenerated catalyst fluidized by a gas such as steam from a nozzle 22. The catalyst cracks the hydrocarbon feed stream and a mixture of spent catalyst particles and gaseous cracked hydrocarbons exit discharge openings in the swirl tubes 18 into the disengagement section 16. Tangential discharge of gases and spent catalyst from the swirl tubes 18 produces a swirling helical motion about the interior of the disengagement section 16, causing heavier catalyst particles to fall into a dense catalyst bed 24 and a mixture of gaseous cracked hydrocarbons and entrained spent catalyst particles to travel up a gas recovery conduit 26 and enter into cyclones 28. In the cyclones 28, centripetal force imparted to the mixture induces the heavier entrained catalyst particles to fall through diplegs 30 of the cyclone 28 into a dense catalyst bed 32 at the bottom of the separator vessel 14. The gases in the cyclones 28 more easily change direction and begin an upward spiral with the gases ultimately exiting the cyclones 28 through outlet pipes 34. Cracked gases leave the separator vessel 14 though an outlet conduit 36. The cracked gases are optionally sent via a line 46 to a further separation (not shown) to remove any light loading of catalyst particles and then to fractionation. Spent catalyst particles in the dense catalyst bed 32 enter the disengagement section 16 through windows 38 where they join spent catalyst particles in the dense catalyst bed 24 in a stripping section 40 of the disengagement section 16. The spent catalyst particles are stripped of entrained cracked vapors over baffles 42 with a stripping medium such as steam entering from at least one nozzle 44. The stripped cracked vapors travel up to the gas recovery conduit 26 where they are processed with other cracked product vapors.

Stripped spent catalyst from the stripping section 40 of the separator vessel 14 of the FCC reactor 10 travels through a spent catalyst pipe 48 regulated by a control valve 49 and preferably into the regenerator 50. In an embodiment, some of the stripped catalyst may be delivered to the secondary reactor 70. In the regenerator 50, stripped spent catalyst is subjected to hot oxygen-containing gas such as air from a distributor 53. Coke is burned from the spent catalyst as the catalyst is heated. Regenerated catalyst collects in a dense catalyst bed 58 whereas entrained catalyst is removed from regenerator effluent gases in cyclones 60 and 62. Flue gas exits the cyclone 62 through an outlet pipe 64 to exit the regenerator 50 through an outlet 66. Regenerated catalyst from the dense catalyst bed 58 travels through a first regenerated catalyst pipe 68 regulated by a control valve 69 into the reactor vessel 12 where it is fluidized and contacted with fresh feed. Regenerated catalyst also exits the regenerator 50 through a second regenerated catalyst pipe 52 regulated by a control valve 54 into a mixing pot 72 of and at the base of the secondary reactor 70.

The contacting of feed and catalyst occurs in a reactor vessel 74 of the secondary reactor 70. Control valves 54,80 govern the rate of catalyst circulation to the reactor vessel 74. If the reactor vessel 74 includes a catalyst bed, the catalyst circulation rate influences the height of the catalyst bed in the reactor vessel 74. The height of the catalyst bed in the reactor vessel 74 of the secondary reactor 70 influences the weight hourly space velocity (WHSV) of reactants through the reactor vessel 74. For example, if a greater WHSV is desired, the control valves 54, 80 would be closed relatively more to reduce the height of catalyst in a dense catalyst bed and the ratio of catalyst to oil. On the other hand, if smaller WHSV is desired, the control valves 54, 80 would be opened relatively more to increase the level of catalyst in the dense catalyst bed 82 and the ratio of catalyst to feed. Relative settings of the control valves 54, 80 are independently adjusted also to obtain the desired temperature and mixture of the catalyst in the dense catalyst bed 82 that will contact the feed in reactors 84.

The cracked product stream in the line 46 from the FCC reactor 10, relatively free of catalyst particles and including the stripping fluid, is transferred to a fractionator main column which is not shown in the drawings. One or more cuts from the main column is preferably sent to the secondary reactor 70 to be contacted with the catalyst therein. In one embodiment, a cut from the main column such as a light cycle oil cut (LCO) may be hydrotreated in a hydrotreating reactor before it is sent to the secondary reactor 70 for cracking.

In a preferred embodiment, the secondary reactor 70 includes the reactor vessel 74 and a separator vessel 76. Spent mixed catalyst is delivered by a recycle spent mixed catalyst pipe 78 governed by the control valve 80 and regenerated catalyst is delivered by the second regenerated catalyst pipe 52 governed by the control valve 54 to the mixing pot 72. Fluidizing medium such as steam delivered by a line 77 to a diluent nozzle 79 to fluidize the mixed catalyst in the mixing pot 72 and generates the dense catalyst bed 82 having an upper level 83. The mixing pot 72 enables adequate mixing and temperature equilibration of spent and regenerated catalyst before it is introduced to the feed. The elevation of the upper level 83 will be proportional to the settings of the control valves 54, 80 relative to fully open. Although one reactor 84 may be used for carrying out the purposes of this invention, the provision of a plurality of reactors 84 with dedicated nozzles 88 and control valves 89 to govern the flow rate of feed to each of the reactors 84 may offer flexibility over use of a single reactor 84 by increasing the operating range of space velocity.

Figure 2:
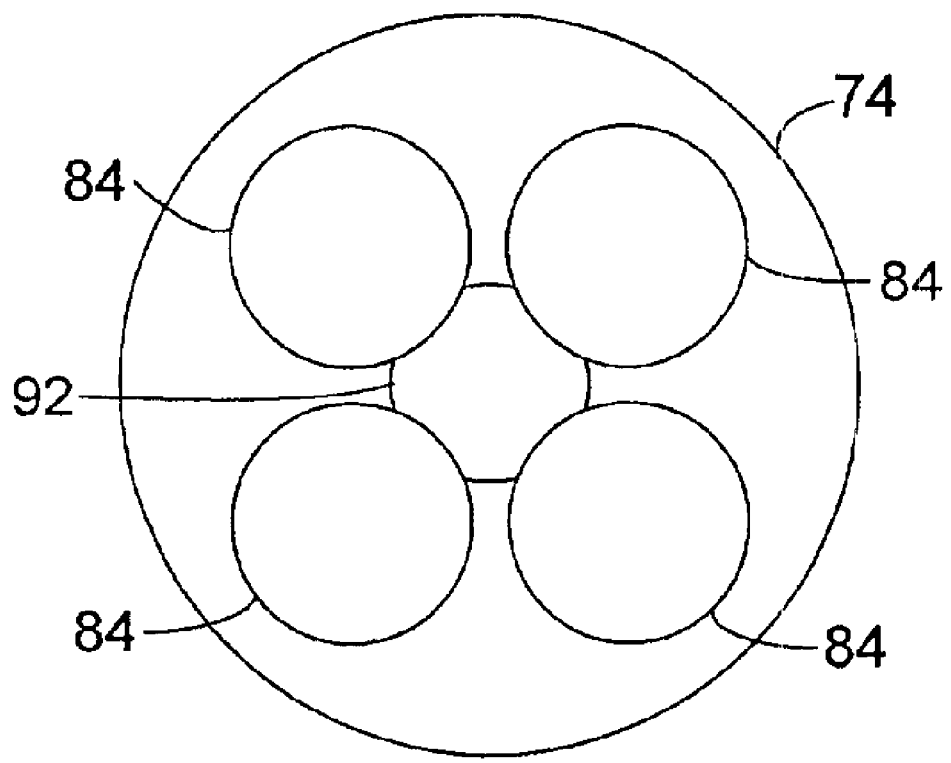
FIG. 2 is a sectional, plan view taken along segment 2—2 in FIG. 1.

FIG. 2 is an upwardly looking cross-sectional view taken along segment 2—2 of the reactor vessel 74. FIG. 2 shows a preferred embodiment including four reactors 84 in the reactor vessel 74.

Hydrocarbon feed which may be a fraction or all of the effluent in the line 46 from the FCC reactor 10 is distributed by a line 86 through the nozzles 88 to the respective reactors 84 in the reactor vessel 74. The reactors 84 may be tubular with an open bottom end communicating with the dense catalyst bed 82 in the reactor vessel 74. Feed entering the reactors 84 preferably pulls mixed catalyst from the dense catalyst bed 82 into the reactors where contacting occurs. The amount of mixed catalyst pulled into the reactor 84 for a given flow rate of feed will be proportional to the height of upper level 83 of the dense catalyst bed 82 which is controlled by control valves 54, 80. Hence, the ratio of catalyst to feed, the space velocity and the density in the reactor can all be controlled by controlling the elevation of the upper level 83 of the dense catalyst bed 82 and/or controlling or eliminating the flow rate of the feed through one or more of the nozzles 88.

A top end 85 of the reactors 84 has a reduced cross-sectional area that may take the form of a frustoconical section. The reduced cross-sectional area of the top end 85 serves to accelerate the mixture of vapor product and spent mixed catalyst as they exit the reactor vessel 74 and enter outlet conduits 90. The outlet conduits 90 communicate the reactor vessel 74 with a transport conduit 92 in the form of a riser. The outlet conduits 90 may be supplanted by a direct connection of the reactor 84 to the transport conduit 92. The outlet conduits 90 should all have a smaller cross-sectional area than the respective reactor 84 and the transport conduit 92 preferably has a cross-sectional area that is less than the aggregate cross-sectional area of all of the reactors 84 that feed the transport conduit 92. Consequently, upon leaving the reactor 84, the product vapor and spent mixed catalyst accelerate into a transport mode, thus giving the spent mixed catalyst and product vapor little time to further react or crack into undesirable products. Entering transport mode also prevents catalyst from falling out of entrainment with the product vapor.

Spent mixed catalyst and product ascend from the reactor vessel 74 through the transport conduit 92 to the separator vessel 76. The spent mixed catalyst and vapor product exit through discharge openings 94 in swirl tubes 96 to effect a primary, centripetal separation of spent mixed catalyst from the vapor product. Separated spent mixed catalyst settles into a dense bed 98 in the separator vessel 76. The spent mixed catalyst in the separator vessel 76 is then preferably stripped over a series of baffles 100 by use of a stripping medium such as steam entering through stripping nozzles 102 in a stripping section 103 of the separator vessel 76. A first portion of the stripped spent mixed catalyst exits the separator vessel 76 through a spent mixed catalyst pipe 104 at a flow rate governed by a control valve 106. The stripped spent mixed catalyst enters a riser 108 which distributes it to the bed 58 in the regenerator 50. Alternatively, the spent mixed catalyst pipe 104 may deliver spent mixed catalyst to the FCC reactor 10. A second portion of the stripped spent mixed catalyst is withdrawn through the recycle spent mixed catalyst pipe 78 at a flow rate governed by the control valve 80 and is delivered to the mixing pot 72 where it is mixed with regenerated catalyst delivered from the second regenerated catalyst pipe 52. Product vapors and entrained catalyst are withdrawn from the separator vessel 76 through an outlet pipe 110 and are delivered to an external cyclone separator 112. Alternatively, the cyclone separator 112 could be installed inside the separator vessel 76. The entrained catalyst is centripetally separated from product vapors in the cyclone separator 112. Separated catalyst exits through a dipleg 116 and is returned to the reactor vessel 74 at a flow rate governed by a control valve 118. Product vapors in a line 120 are withdrawn from the cyclone separator 112 through an outlet 114 and sent to further product processing.

It is important to not mix the vaporous product from the second separator vessel 14 with the vaporous product from the first separator vessel 76. Such mixing could negate upgrading of the product wrought in the secondary reactor 70. This is especially true when the secondary reactor 70 processes feed that is derived from the FCC reactor 10. Hence, the produce in the line 120 is preferably isolated from the product in the line 46. Additionally, it is preferable to keep pipes 48, 52, 68, 104 separate.

This invention can employ a wide range of commonly used FCC catalysts. These catalyst compositions include high activity crystalline alumina silicate or zeolite containing catalysts. Zeolite catalysts are preferred in FCC operation because of their higher intrinsic activity and their higher resistance to the deactivating effects of high temperature exposure to steam and exposure to the metals contained in most feedstocks. Zeolites are usually dispersed in a porous inorganic carrier material such as silica, aluminum, or zirconium. These catalyst compositions may have a zeolite content of 30% or more. Zeolites including high silica-to-alumina compositions such as LZ-210, ST-5 and ZSM-5 type materials are preferred when lighter products are desired from either the FCC or secondary reactor. Another particularly useful type of FCC catalysts comprises silicon substituted aluminas. As disclosed in U.S. Pat. No. 5,080, 778 B1, the zeolite or silicon enhanced alumina catalysts compositions may include intercalated clays, also generally known as pillared clays. The preferred catalysts for the present invention include USY zeolites.

Typically, the catalyst circulation rate through the reactor vessel 12 of the FCC reactor 10 and the input of feed and any lift gas that enters the reactor vessel 12 will be operated to produce transport conditions with a flowing density of less than 48 kg/m$^3$ (3 lbs/ft$^3$) and an average superficial velocity of more than 3.7 up to 31 m/s (12 to 93 ft/s). In the FCC reactor 10, catalyst will usually contact the hydrocarbons in a catalyst to oil ratio in a range of from 3 to 8, and more preferably in a range of from 4 to 6. The length of the reactor vessel 12 will usually be set to provide a residence time of between 0.5 to 10 seconds at these average flow velocity conditions. Other reaction conditions in the reactor vessel 12 usually include a temperature of from 468° to 566° C. (875° to 1050° F.).

Feeds suitable for processing in the FCC reactor 10 include conventional FCC feedstocks or higher boiling hydrocarbon feeds. The most common of the conventional feedstocks is a vacuum gas oil which is typically a hydrocarbon material having a boiling range of from 343° to 552° C. (650° to 1025° F.) and is prepared by vacuum fractionation of atmospheric residue. Such fractions are generally low in coke precursors and heavy metals which can deactivate the catalyst.

The effluent from the FCC reactor 10 in the line 46 may be processed in a main column (not shown) into fractions that include a light off-gas stream, a light gasoline liquid stream, a heavy gasoline stream, a light cycle oil ("LCO") stream, a heavy cycle oil ("HCO") stream and a clarified oil ("CO") stream. The light gasoline or light naphtha fraction preferably has an initial boiling point (IBP) at or above about –5° C. (23° F.) in the $C_4$ range and an end point (EP) at a temperature greater than or equal to 127° C. (260° F.). The boiling points for these fractions are determined using the procedure known as ASTM D86-82. The heavy gasoline or heavy naphtha fraction has an IBP at or above 127° C. (260° F.) and an EP preferably between 204° and 232° C. (400° and 450° F.), particularly at 216° C. (420° F.). The LCO stream has an IBP at about the EP temperature of the heavy gasoline and an EP in a range of 260° to 371° C. (500° to 700° F.) and preferably 288° C. (550° F.). The HCO stream has an IBP of the EP temperature of the LCO stream and an EP in a range of 371° to 427° C. (700° to 800° F.), and preferably about 399° C. (750° F.). The CO stream has an IBP of the EP temperature of the HCO stream and includes everything boiling at a higher temperature. Any or all of these fractions may be treated in the secondary reactor 70. The hydrocarbon feed preferably comprises at least 50 wt-% naphtha.

Alternatively, the feed to the secondary reactor 70 may come from a source other than the effluent from the FCC reactor 10. Coker naphtha is one example of feed that could be independently derived and fed to the secondary reactor 70.

In the secondary reactor 70, the predominant reaction may be cracking in which a hydrocarbon molecule is broken into two smaller hydrocarbon molecules, so that the number of carbon atoms in each molecule diminishes. Alternatively, the predominant reaction in the secondary reactor 70 may be a hydrogen-transfer reaction such as reformulation or isomerization in which the structures of the molecules are changed but the number of carbon atoms in each molecule does not change.

Olefins, naphthenes and cyclo-olefins are reformulated into paraffins, aromatics and some naphthenes as shown in formulas (3), (4), (5) and (6).

$$3C_nH_{2n}+C_mH_{2m}\rightarrow 3C_nH_{2n+2}+C_mH_{2m-6} \quad (3)$$

olefins+naphthene→paraffins+aromatic $$4C_nH_{2n}\rightarrow 3C_nH_{2n+2}+C_nH_{2n-6} \quad (4)$$

olefins→paraffins+aromatic $$C_mH_{2m-2}+2C_nH_{2n}\rightarrow C_mH_{2m-6}+2C_nH_{2n+2} \quad (5)$$

cyclo-olefins+olefins→aromatic+paraffins $$C_nH_{2n}+H_2\rightarrow C_nH_{2n+2} \quad (6)$$

olefins+hydrogen→paraffins

Olefins have a higher octane value than their paraffinic counterpart. Hence, the conversion of olefins to paraffins typically degrades octane value. When the olefins cyclitize to become aromatics as shown in formulas (3) and (4) and when cyclo-olefins aromaticize to yield aromatics as in formula (5), they donate much hydrogen. Other olefins pick up the hydrogen to become paraffins as shown in formula (6). In the present invention using the secondary reactor 70, normal olefins and isoolefins predominantly reformulate to isoparaffins which carry a higher octane rating than normal paraffins. Additionally, aromatics also boost the octane rating of the product. Because the isoparaffins and aromatics have a high octane rating, the hydrogen transfer reformulation in the secondary reactor 70 maintains the high octane ratings despite the typical octane rating decline that accompanies conversion of olefins to paraffins. Accordingly, the hydrogen-transfer reactions in the secondary reactor 70 which yield more isoparaffins and aromatics are superior to a process that saturates the olefins into normal paraffins. Advantageously, the hydrogen transfer reactions are performed without the addition of hydrogen, which can be expensive and difficult to obtain.

The reaction in the secondary reactor 70 is preferably conducted with the same catalyst circulated through the regenerator 50 and the FCC reactor 10. Of course, if the secondary reactor 70 stands alone without incorporation into an FCC reactor, the catalyst in the secondary reactor 70 need not be circulated through an FCC reactor When hydrogen-transfer reactions are desired to predominate over cracking reactions in the secondary reactor 70, high rare earth content Y zeolites are preferred. The term "high rare earth content" denotes greater than about 2.0 wt-% rare earth oxide on the zeolite portion of the catalyst. High rare earth content Y zeolites such as USY zeolite may have as much as 4 wt-% rare earth. The high rare earth content promotes hydrogen transfer by increasing adjacent acid site density on the catalyst. Strongly acidic catalyst sites on the catalyst promote cracking. Y zeolites with low rare earth content can still effectively promote hydrogen transfer but with longer reactor residence times. When cracking reactions are desired to predominate over hydrogen transfer reactions in the secondary reactor 70, low rare earth Y zeolite catalysts are preferred which have a rare earth oxide content of 2.0 wt-% or less. Additives, such as sulfur-reducing additives, may be added to the catalyst. It is anticipated that such additives may experience enhanced effectiveness in the secondary reactor 70 for longer residence times.

In an embodiment of the present invention, the secondary reactor 70 may be operated at bubbling bed conditions. In such an embodiment, separate reactors 84 may not be necessary. In an additional embodiment, the secondary reactor 70 may be operated at transport conditions. In this embodiment, the reactor vessel 74 or the reactors 84 would likely comprise a conduit such as a riser. However, it is preferred to contact catalyst and feed in the secondary reactor 70 under fast fluidized flow conditions. Even under fast fluidized conditions, the mixed catalyst preferably accumulates in the dense catalyst bed 82 operated at bubbling bed conditions until it is pulled into one of the reactors 84. Hence, the fluidizing medium is delivered by the nozzle 79 preferably to generate a superficial velocity in the reactor vessel 74 of less than 0.5 m/s (1.5 ft/s) and a density of greater than 480 kg/m$^3$ (30 lb/ft$^3$). Once the hydrocarbon feed and the catalyst enter the reactors 84, they preferably flow in a fast fluidized flow regime. Hence, the mixture of catalyst and vaporized feed is homogeneous leaving no discernible surface of a bed in the reactor 84. Thoroughly mixing catalyst and vapor phases reduces the generation of coke. To achieve the fast fluidized regime, the superficial velocity of the vaporized feed from the nozzles 88 should preferably be between 1.3 and 3.7 m/s (4 and 12 ft/s) and the density in the reactor 84 preferably should be between 48 and 320 kg/m$^3$ (3 and 20 lb/ft$^3$) for typical FCC catalysts. Adequate, but less thorough mixing, may occur even in a turbulent bed. However, the superficial vapor velocity should always be at least 0.6 m/s (1.8 ft/s) and the density in the reactor should never exceed 480 kg/m$^3$ (30 lb/ft$^3$) to avoid approaching a less desirable bubbling bed condition in the reactors 84 for typical FCC catalysts. In a fast fluidized flow regime, the slip ratio is between 2.5 and 10 and preferably at or above 3.0. The slip velocity is high but does not extend into the transport mode of less than 0.3 m/s (1.0 ft/s) and is preferably kept above or at 0.5 m/s (1.5 ft/s) for typical FCC catalysts to provide for back mixing to occur and adequate time for hydrogen transfer reactions to occur. The slip velocity of greater than or equal to 0.3 m/s (1.0 ft/s) will not be a meaningful parameter for a fast fluidized flow regime at high superficial gas velocities such as those well into the typical transport range. To assure that the effluent from the reactors 84 enters transport mode to terminate the reactions, the outlet conduits 90 and/or the transport conduit 92 should be dimensioned to make attainable a superficial velocity of greater than 3.7 m/s (12 ft/s), a flowing density of less than 48 kg/m$^3$ (3 lb/ft$^3$) and a slip ratio of less than 2.5.

The foregoing variable ranges for bed and flow regimes are based on the characteristics of typical FCC catalysts and naphtha range vaporized feed. These ranges may vary if different catalysts or feeds with different molecular weights are used in the present invention.

If hydrogen-transfer reactions are intended to predominate over cracking reactions in the secondary reactor 70, the WHSV should typically range from 1 to 25 hr$^{-1}$ and the temperature should range from 399° to 510° C. (750° to 950° F.). Cracking reactions will be more frequent if both the space velocity and temperature are at the high ends of these ranges. However, hydrogen transfer reactions may still predominate at higher space velocity offset by lower temperature in these ranges and vice versa. If cracking reactions are to predominate over hydrogen-transfer reactions in the secondary reactor 70, the WHSV should typically range from 15 to 50 hr$^{-1}$ and the temperature should range from 482° to 649° C. (900° to 1200° F.). Hydrogen transfer reactions will be more frequent if both the space velocity and temperature are at the low ends of these ranges. However, cracking reactions may still predominate at lower temperature offset by higher space velocity in these ranges and vice versa. To ensure controlled catalytic cracking reactions occur instead of thermal cracking reactions, it is advantageous to keep the temperature of the secondary reactor 70 below 566° C. (1050° F.). Hence, temperature control is important for both types of reactions.

Mixing regenerated catalyst and spent catalyst can reduce the temperature of the mixed catalyst contacting the feed to the secondary reactor 70 by 27° to 166° C. (50° to 300° F.) depending on the regenerator temperature and the ratio of recycled spent mixed catalyst to regenerated catalyst mixed in the secondary reactor 70. It will be preferred to operate the ratio of recycled spent catalyst to regenerated catalyst at 1:1 if predominant hydrogen transfer reactions are desired.

Spent catalyst from the separator vessel 14 of the FCC reactor 10 may be recycled to the secondary reactor 70 to be mixed with regenerated catalyst instead of or in addition to spent mixed catalyst from the separator vessel 76. However, at least some regenerated catalyst will have to be mixed with the spent catalyst or spent mixed catalyst to give the mixed catalyst enough heat to vaporize the feed. Even using an external feed heater to vaporize the feed would be less efficient and prone to cause coking. In an alternative embodiment, spent mixed catalyst from the separator vessel 76 may be transported to the FCC reactor 10 instead of to the regenerator 50.

If cracking reactions are desired to predominate over hydrogen transfer reactions in the secondary reactor 70, less spent catalyst should be recycled to the secondary reactor 70. Hence, the ratio of regenerated to spent catalyst in the secondary reactor 70 will be higher. The resulting higher reactor temperature and greater availability of uncoked acid sites on the regenerated catalyst will promote cracking reactions.

We have also found that higher pressures favor hydrogen transfer reactions but also favor coke production. Hence, it is suitable to operate the reactor at a pressure of between 69 and 207 kPa (10 and 30 psig) and preferably between 83 and 138 kPa (12 and 20 psig). Additionally, to promote hydrogen transfer reactions, a catalyst to feed ratio should be set between 2 and 8 and preferably between 4 and 7. Higher pressures also favor catalytic cracking but without significant coke generation. Hence, when catalytic cracking reactions are desired to predominate in the secondary reactor 70, a suitable reactor pressure is between 138 and 276 kPa (20 and 40 psig). Moreover, because higher temperature is necessary to promote the catalytic cracking reactions, more catalyst will be circulated to the secondary reactor 70 to provide sufficient heating. Hence, a catalyst to feed ratio between 5 and 11 and preferably between 7 and 10 will be appropriate to promote catalytic cracking reactions.

The reformulation of the fraction from the main column by hydrogen transfer in the secondary reactor 70 reduces the concentrations of organic sulfur and nitrogen compounds in the products. The reaction of the gasoline fraction in the secondary reactor 70 can lower sulfur concentration in the reactor products by as much as 80 wt-% and nitrogen concentration in the products by as much as 98 wt-%. Hence, the products from the secondary reactor 70 will contain low concentrations of sulfur and nitrogen compounds. Leftover sulfur and nitrogen compounds can be removed from the product by hydrotreating and taken off in the overhead of a finishing distillation column or by another suitable method if necessary to meet specifications.

EXAMPLE

An investigation was conducted to determine the effect of mixing spent catalyst and regenerated catalyst on reactor temperature. At a spent to regenerated catalyst ratio of 1:1, with an FCC reactor vessel operating at 527° C. (980° F.) and a regenerator operating at 704° C. (1300° F.), the catalyst introduced to the secondary reactor will be 616° C. (1140° F.) giving a reactor temperature around 482° C. (900° F.). Hence, the temperature of the secondary reactor will be in the range that promotes hydrogen transfer over catalytic cracking reactions.

What is claimed is:

1. A process for cracking and further treating hydrocarbons, said process comprising:

contacting a first hydrocarbon feed stream with regenerated catalyst to yield cracked hydrocarbons and spent catalyst;

separating said spent catalyst from said cracked hydrocarbons in a first separator vessel;

regenerating at least a portion of said spent catalyst to provide regenerated catalyst;

mixing regenerated catalyst and spent mixed catalyst to provide mixed catalyst;

contacting a second hydrocarbon feed stream with said mixed catalyst to yield upgraded hydrocarbons and spent mixed catalyst; and separating said upgraded hydrocarbons from said spent mixed catalyst in a second separator vessel.

2. The process of claim 1 further including deriving said second hydrocarbon feed from said cracked hydrocarbons.

3. The process of claim 1 further including fractionating said cracked hydrocarbons to provide said second hydrocarbon feed.

4. The process of claim 1 further including regenerating said spent catalyst and said spent mixed catalyst in the same regenerator.

5. The process of claim 1 further including stripping said spent mixed catalyst with a stripping medium before regenerating said spent mixed catalyst.

6. The process of claim 1 further comprising additionally separating said upgraded hydrocarbons from said spent mixed catalyst outside of said second separator vessel.

7. The process of claim 1 further comprising regenerating a portion of said spent mixed catalyst to provide regenerated catalyst.

8. A process for cracking and further treating hydrocarbons comprising:

contacting a first hydrocarbon stream with catalyst to yield cracked hydrocarbons and spent catalyst in a first reactor vessel;

separating said spent catalyst from said cracked hydrocarbons in a first separator vessel;

mixing regenerated catalyst with recycled spent catalyst to provide mixed catalyst;

contacting a second hydrocarbon stream with said mixed catalyst in a second reactor vessel to yield upgraded hydrocarbons and spent mixed catalyst, separating said spent mixed catalyst from said upgraded hydrocarbons in a second separator vessel;

recycling at least a portion of said spent mixed catalyst as recycled spent catalyst.

9. The process of claim 8 wherein said spent mixed catalyst is recycled through a recycle catalyst pipe in communication with said second reactor vessel and said second separator vessel.

10. The process of claim 8 further including deriving said second hydrocarbon stream from said cracked hydrocarbons.

11. The process of claim 8 further including regenerating said spent catalyst and a portion of said spent mixed catalyst in the same regenerator.

12. The process of claim 8 further including stripping said spent mixed catalyst with a stripping medium.

13. The process of claim 8 further comprising additionally separating said upgraded hydrocarbons from said spent mixed catalyst outside of said second separator vessel.

14. A process for cracking and further treating hydrocarbons comprising:

contacting a first hydrocarbon stream with catalyst to yield cracked hydrocarbons and spent catalyst in a first reactor vessel;

separating said spent catalyst from said cracked hydrocarbons in a first separator vessel;

contacting a second hydrocarbon stream with recycled catalyst in a second reactor vessel to yield upgraded hydrocarbons and spent recycled catalyst, separating said spent recycled catalyst from said upgraded hydrocarbons in a second separator vessel;

recycling at least a portion of said spent recycled catalyst as recycled catalyst to said second reactor vessel.

15. The process of claim 14 wherein said recycled catalyst is recycled through a recycle catalyst pipe in communication with said second reactor vessel and said second separator vessel.

16. The process of claim 14 further including deriving said second hydrocarbon stream from said cracked hydrocarbons.

17. The process of claim 14 further including fractionating said cracked hydrocarbons to provide said second hydrocarbon stream.

18. The process of claim 14 further including regenerating said spent catalyst and a portion of said spent recycle catalyst in the same regenerator.

19. The process of claim 14 further including stripping said spent recycled catalyst with a stripping medium.

20. The process of claim 14 further comprising additionally separating said upgraded hydrocarbons from said spent recycled catalyst outside of said second separator vessel.

* * * * *